B. R. BENJAMIN.
GUARD FINGER FOR HARVESTER THRESHERS.
APPLICATION FILED APR. 9, 1917.
1,397,942.
Patented Nov. 22, 1921.
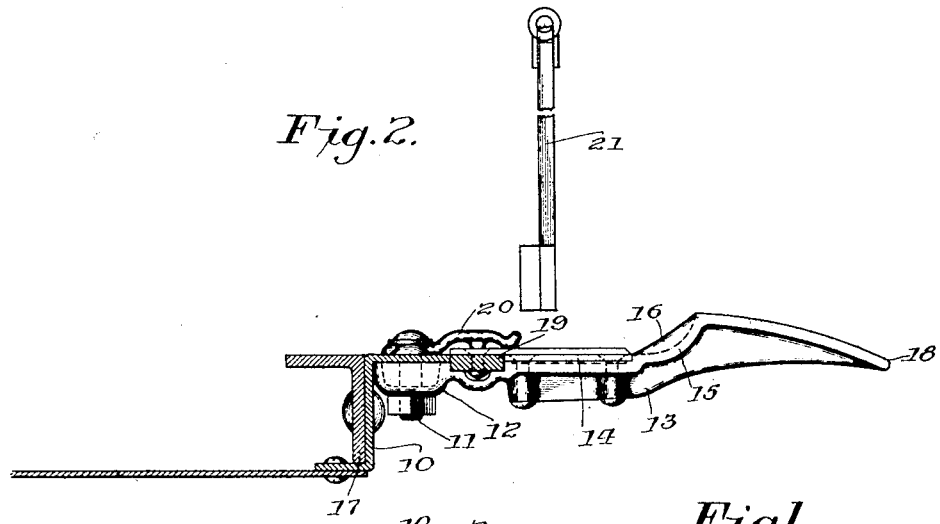
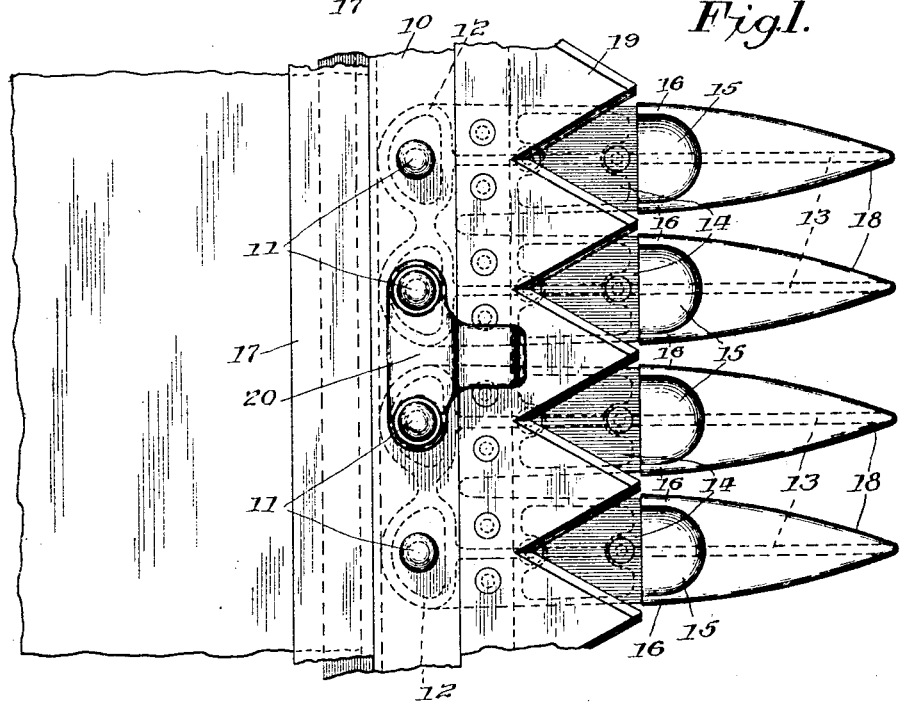
Inventor
Bert R. Benjamin,
by Chas. E. Lord
Atty.

UNITED STATES PATENT OFFICE.

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

GUARD-FINGER FOR HARVESTER-THRESHERS.

1,397,942.

Specification of Letters Patent.  Patented Nov. 22, 1921.

Application filed April 9, 1917. Serial No. 160,693.

*To all whom it may concern:*

Be it known that I, BERT R. BENJAMIN, a citizen of the United States, residing at Oak Park, in the county of Cook and State of Illinois, have invented certain new and useful Improvements in Guard-Fingers for Harvester-Threshers, of which the following is a full, clear, and exact specification.

My invention relates to guard fingers for harvester threshers and like machines.

It is well known that for the successful operation of harvester threshers the grain must be well cured in the field before being cut, and one serious drawback in the use of harvester threshers arises from the fact that a considerable quantity of shelled grain falls between the guard fingers and is lost.

The object of this invention is to provide means whereby this shelled grain which falls from the grain heads when the grain is being operated upon by a harvester thresher is prevented from falling to the ground and is retained in such a position that the reel arms, acting as fans, together with the incoming straw, will convey the same rearwardly to the grain platform.

One embodiment of this invention is illustrated in the accompanying drawings, in which—

Figure 1 is a top plan view of a section of the finger bar; and

Fig. 2 is a side elevational view of one of the guards with some of the adjacent parts shown in cross section and a portion of the reel structure shown above the finger bar.

The finger bar is made up of a series of pairs of guard fingers, two of these pairs being shown in Fig. 1. These pairs are bolted to the angular frame member 10 by bolts 11 which extend through suitable apertures in the rear ends of the body portion 12. The guard fingers are provided with a longitudinal vertical rib 13 extending from the front to the rear thereof, the rear portion of these fingers being substantially horizontal as in the usual construction and having secured thereto stationary knives 14. These fingers are upwardly and forwardly inclined, as shown at 15, intermediate their front and rear portions and are provided at their front ends with downwardly curved teeth 18. The upwardly inclined intermediate portion 15 is provided with a side wall 16 at each edge thereof, the portion 15 and walls 16 forming a cup-shaped recess or pocket. The angular frame member 10 is secured to a platform support 17 of the usual construction, and the reciprocating knife 19 is held in contact with the stationary knife 14 by the usual tension member 20.

In Fig. 2, I have shown one arm 21 of the usual harvester reel in the position it assumes relative to the finger bar, and it will be seen that as the shelled grain falls from the heads into the pockets formed by the inclined portion 15 and the side walls 16, the reel arms 21 will act as a fan and blow these shelled heads rearwardly over the knives and onto the grain platform, where they would be conveyed with the cut grain to the threshing cylinder. It is also to be noted that as the grain is being cut the reel as it rotates will move the grain rearwardly over the knives and into the grain platform, and any shelled grain dropping in the pockets will be acted upon by the butt ends of the incoming straw and be conveyed rearwardly with the same. The shelled grain as it falls into the pockets will slide rearwardly and downwardly in close proximity to the knife and from that point will be positively moved rearward by the straw.

Attention is called to the fact that the guard fingers illustrated herein are spaced apart in the usual manner, thereby allowing the stalks of the grain to pass rearwardly between them to a position where they may be cut by the knife.

While I have herein illustrated and described one embodiment which the invention may assume in practice, it is to be understood that modifications may be made without departing from the spirit of the invention as expressed in the following claims.

What I claim as my invention and desire to secure by Letters Patent is:

1. In a harvester, a finger bar having forwardly projecting spaced apart guard fingers, and rearwardly and downwardly inclined means carried by said guard fingers for catching shelled grain falling thereon and directing the grain rearwardly.

2. A finger bar for harvesters provided with spaced apart forwardly projecting guard fingers, said fingers having rearwardly and downwardly inclined means for catching and retaining shelled grain.

3. A guard finger for harvesters having a stationary knife secured thereto and provided with an upwardly opening pocket located entirely in advance of said knife.

4. A guard finger for harvesters having on its upper surface a downwardly curved front portion, a rearwardly and downwardly inclined intermediate portion, and a substantially horizontal rear portion, and side walls for said inclined intermediate portion forming therewith a pocket.

5. A guard finger for harvesters having a downwardly depending longitudinal rib, said rib supporting a substantially horizontal rear portion, an upwardly inclined intermediate portion, and a downwardly curved tapered front portion, said intermediate portion being provided with side walls forming a pocket.

6. A guard finger for harvesters having a pocket, the forward portion of said pocket having a steep rearward and downward concavity.

7. A guard finger for harvesters having a forwardly and downwardly inclined front portion, and a pocket disposed in the rear of said front portion, having a rearward and downward concavity.

8. A guard finger for harvesters having a stationary knife secured thereto and provided with a pocket, said pocket having a rearwardly and downwardly inclined bottom wall, the rear portion of said bottom wall being located substantially in the plane of said stationary knife.

9. A guard finger for harvesters having a stationary knife secured thereto, a reciprocatory knife mounted on said stationary knife, said guard finger being provided with a pocket having a bottom wall and side walls, the rear ends of said side walls terminating in a line substantially coinciding with the path of movement of the front end of said reciprocating knife.

In testimony whereof I affix my signature.

BERT R. BENJAMIN.